A. S. KINNEY.
SPRING WHEEL.
APPLICATION FILED JUNE 1, 1910.
1,084,448.
Patented Jan. 13, 1914.
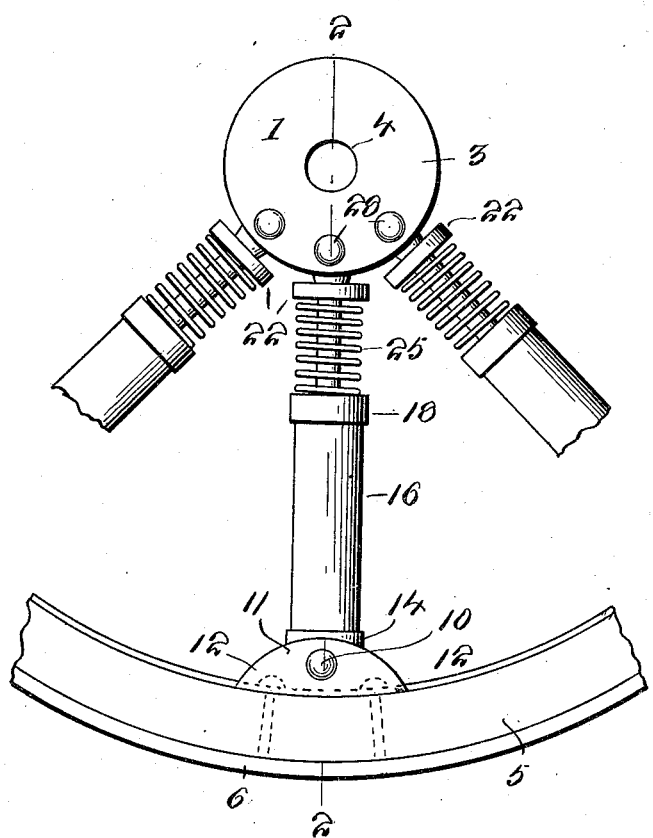
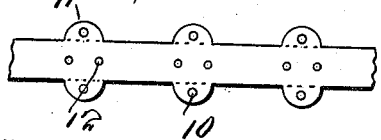
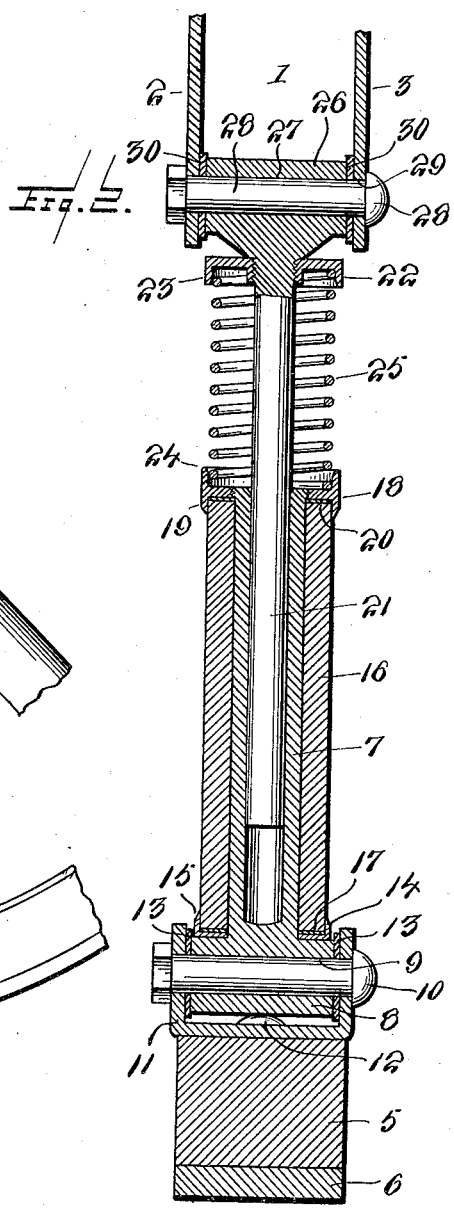
Inventor
Albert S. Kinney
By Victor J. Evans
Attorney
Witnesses

UNITED STATES PATENT OFFICE.

ALBERT S. KINNEY, OF MIDDLETOWN, OHIO.

SPRING-WHEEL.

1,084,448.  Specification of Letters Patent.   Patented Jan. 13, 1914.

Application filed June 1, 1910.  Serial No. 564,420.

*To all whom it may concern:*

Be it known that I, ALBERT S. KINNEY, a citizen of the United States, residing at Middletown, in the county of Butler and State of Ohio, have invented new and useful Improvements in Spring-Wheels, of which the following is a specification.

This invention relates to spring wheels and more particularly to spokes used in connection therewith, the object of the invention being to provide a spoke which is resilient lengthwise of its body so that all the advantages of a pneumatic tired wheel may be obtained in a wheel using spokes of this character.

A further object of the invention is the provision of a novel spoke which may be reversed in its connection between the hub and felly.

Further objects of the invention will appear as the following specific description is read in connection with the accompanying drawing which forms a part of this specification, and in which:

Figure 1 is a detail elevation of a wheel showing my improved spoke secured therein. Fig. 2 is an enlarged detail sectional view on the line 2—2 of Fig. 1. Fig. 3 is a detail plan view of the felly blank.

Referring more particularly to the drawing 1 represents the hub which comprises the side plates 2 and 3 and the axle boxing 4. The felly is shown at 5 and the wheel tire at 6.

The spokes which are used in connection with the hub and felly above mentioned comprise a piston cylinder 7 provided at its outer end with a transverse head 8 having a central aperture 9 to receive the pivotal bolt 10 which secures the cylinder to the felly band 11. This band is secured to the felly 5 by bolts 12 and has interposed between its pivoting ears suitable shock absorbing washers 13. Surrounding the base of the cylinder 7 and resting upon the head 8 is a collar 14 having a vertical annular flange 15 which forms a socket for the end of the hollow wooden section 16 of the spoke. A suitable washer 17 is interposed between the end of the spoke and the collar 14. A similar collar 18 is threaded in the upper end of the cylinder 7 and is provided with a downwardly extending flange 19 which forms a socket adapted to receive the upper end of the wooden section 16 and a similar washer 20 is interposed between the end of the wooden section and the collar.

Reciprocally mounted within the cylinder is a plunger 21 having threaded upon its upper end a collar 22 with a depending flange 23 corresponding with a similar flange 24 on the collar 18. The collars 22 and 18 and their flanges 23 and 24 form a receptacle for a spiral spring 25 which surrounds the plunger 21 and normally keeps its lower end raised in the cylinder. The spring 25 of each spoke is suitably connected to the collars so that it may be active at all times whether extended when at the top of the wheel or depressed when at the base. The plunger 21 has a transverse head 26 similar to the head 8 and is apertured at 27 to receive the pivoting bolt 28 which passes through opposite registering apertures 29 in the side plates 2 and 3 of the hub. As shown in the lower connection of the spoke, the head 26 has interposed between it and the side plate suitable shock absorbing washers 30. It will be noticed that the heads 26 and 8 are exactly similar and by simply disconnecting the bolts 28 and 10, the spoke may be reversed.

Having thus described the invention, what is claimed is—

In a wheel, the combination with a hub and felly, of a continuous band passing around inside of the felly and having a plurality of pairs of integral parallel ears extending inwardly from the band, spokes interconnecting the hub and felly, each comprising a head pivotally connected between a pair of said ears, a closed cylinder integrally connected with the head, a second head pivotally connected to the hub, a plunger section rigidly carried by said second head and adapted to work in said cylinder, a flanged collar carried by the cylinder, a second flanged collar adjustably mounted on the plunger and a spring interposed between said collars and surrounding the plunger.

In testimony whereof I affix my signature in presence of two witnesses.

ALBERT S. KINNEY.

Witnesses:
 OTIS MAY,
 H. E. PHIBBS.